United States Patent [19]

Klainman

[11] Patent Number: 4,834,520

[45] Date of Patent: May 30, 1989

[54] DEVICE FOR STABILIZATION OF BEAM INTENSITY DISTRIBUTION IN LASER SCANNERS

[75] Inventor: Alex Klainman, Netanya, Israel

[73] Assignee: Scitex Corporation Ltd., Herzlia Bet, Israel

[21] Appl. No.: 141,060

[22] Filed: Jan. 5, 1988

[30] Foreign Application Priority Data

Jan. 7, 1987 [IL] Israel ........................................ 81190

[51] Int. Cl.$^4$ ........................ G02B 26/10; H01S 3/22
[52] U.S. Cl. .................................... 350/584; 350/6.8; 350/319; 372/104
[58] Field of Search ................. 350/584, 6.7, 6.8, 319; 372/104

[56] References Cited

U.S. PATENT DOCUMENTS

| | | | |
|---|---|---|---|
| 3,510,193 | 5/1970 | LaRoche | 350/584 |
| 3,873,939 | 3/1975 | Guile et al. | 372/104 |
| 3,973,217 | 8/1976 | Guile | 372/104 |
| 3,973,218 | 8/1976 | Kepler et al. | 372/104 |
| 4,112,388 | 9/1978 | McLafferty | 372/104 |
| 4,138,777 | 2/1979 | Kepler et al. | 372/104 |
| 4,559,628 | 12/1985 | Johnson et al. | 372/104 |

FOREIGN PATENT DOCUMENTS

| | | |
|---|---|---|
| 0096089 | 12/1983 | European Pat. Off. . |
| 2810383 | 9/1979 | Fed. Rep. of Germany . |
| 2532790 | 3/1984 | France . |
| 58-17492 | 10/1983 | Japan . |
| 61-26206 | 11/1986 | Japan . |

OTHER PUBLICATIONS

Bestenreiner et al, "Visibility and Correction of Periodic Interference Structures . . . ", *Journal of Applied Photographic Engineering*, vol. 2, No. 2, Spring 1976, pp. 86–92.

G. C. Valley et al, "Thermal Blooming in Axial Pipe Flow," Applied Optics, vol. 18, No. 16, pp. 2728–2730 (Aug. 15, 1979).

P. L. Eggins et al, "Thermal Blooming of Single Pulse CO2 Radiation", J. Phys. D.; Appl. Phys., vol. 12, No. 12, pp. 2063–2077 (Dec. 1979).

Primary Examiner—John K. Corbin
Assistant Examiner—Martin Lerner
Attorney, Agent, or Firm—Ladas & Parry

[57] ABSTRACT

A laser beam scanning apparatus, a device for stabilization of the beam intensity distribution, the device comprising an air turbulence generator disposed adjacent a portion of the laser beam optical path and adapted to provide forced air flow substantially thereacross, the forced air flow tending to eliminate variations in the index of refraction of the air layers in the optical path.

14 Claims, 3 Drawing Sheets

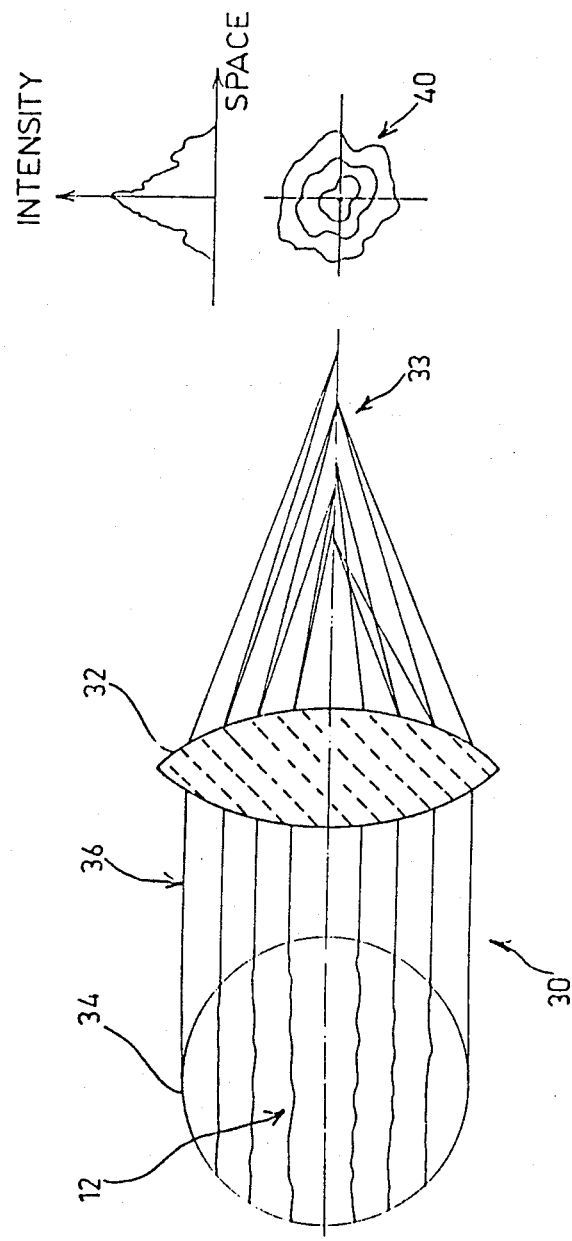

DEVICE FOR STABILIZATION OF BEAM INTENSITY DISTRIBUTION IN LASER SCANNERS

The present invention relates to laser beam scanning apparatus, more pertincularly to a laser plotter or scanner operating with high precision beam positioning components.

BACKGROUND OF THE INVENTION

Use of laser beam scanning apparatus in high-quality applications such as those employing modern color graphic techniques relates to accurate positioning of a laser generated dot relative to adjacent dots, as noted in the literature (e.g. Bestenheimer et al, Journal of Appl. Photo. Eng. vol 2, 1976). A system for improving the performance in these applications has been made the subject of our previous Israel Patent Application, Ser. No. 80242 filed Oct. 7, 1986.

One of the main problems in achieving the accurate positioning required by these applications is that the optical path of the laser beam may constitute layers of air which exhibit different indices of refraction due to thermal or pressure variations between them. This layering phenomenon varies slowly over time with the result that the laser beam passing through these layers will undergo varying deflections and will appear to originate from a plurality of slightly different light sources. Attempting to focus such a beam using a focusing lens will result in a fuzzy focal spot that will change with time according to the layer fluctuation.

The basis for the variations in the air layers through which the laser beam passes has been attributed to the contruction of the optical path. Since the optical path is generally constructed above a support surface integrally formed with the equipment, a thermal gradient is created between the air and the surface due to heat dissipation through the latter. Slow air currents will cause a slight alteration in the makeup of the air layers. Such phenomena can be seen near the surface of an asphalt road on a hot day. Even if the thermal variations are small between air layers, these layers generate different indices of refraction and the accumulation of the effect over long path lengths of the laser beam is perceptible.

The undesired effects of thermal variations in air layers is especially troublesome in the region of the optical path where the laser beam is at its maximum width. The wavefront of the laser beam is no longer of uniform phase but is instead corrugated so that a corrugated beam is produced, and these distortions change with time. Beam tracking in the range of 1 micron is made impossible under these conditions.

It would therefore be desirable to eliminate sources of distortion due to variations in the air layers located in the optical path of laser beam.

SUMMARY OF THE INVENTION

It is accordingly a principal object of the present invention to overcome the above-described problems and provide laser beam scanning apparatus which ensures the uniformity of focusing requirements in high-precision applications.

According to the invention, there is provided in a laser beam scanning apparatus, a device for stabilization of the beam intensity distribution, the device comprising an air turbulance generator disposed adjacent a portion of the laser beam optical path and adapted to provide forced air flow substantially thereacross, the forced air flow tending to eliminate variations in the index of refraction of the air layer in the optical path.

In a preferred embodiment, the air turbulence generator is a pancake-type cooling fan arranged to force the flow of cooling air across the optical path, thereby causing mixing of the air layers therein. The resul is to eliminate stratification and thermal variation between the air layers so as to provide uniformity in the index of refraction presented to the laser beam. The cooling fan may be located adjacent the optical path in the region where the laser beam is at its maximum width, thus enabling a maximum maxing effect of the air through which the beam passes. The result is a laser beam of better quality for use in applications where the position and focus are critical.

The cooling fan arrangement in relation to the optical path is applicable to laser beams generated by any of several sources, argon, helium-neon, etc. The direction of air flow from the fan across the optical path may be from one side to the other or it may be across the optical path from multiple sides thereof, with the proviso that enough air turbulence be created so that the beam behaves in a uniform fashion with regard to focusing and tracking operations. The beam behavior in these operations is thus independent of the location of the various optical components which make up the optical path.

A feature of the invention is the provision of air current deflectors mounted on the fan so as to vary the direction of the force air flow across the optical path.

Another feature of the invention is the provision of the cooling fan with variable speed control to match the required air turbulence level to the level of the existing thermal variation to be eliminated.

In an alternative embodiment, the air turbulence generator is provided as a source of compressed air which is directed across the optical path.

Other features of the invention will become apparent form the drawing and the description hereinbelow.

BRIEF DESCRIPTION OF THE DRAWINGS

For a better understanding of the invention with regard to the embodiments thereof, reference is made to the accompanying drawings, in which:

FIG. 2 is a schematic illustration of thermal variations in the air layers along a portion of the optical path of FIG. 1;

FIG. 2a is a graphic representation of the effect of the thermal variations on the focused scanning and reference beams of FIGS. 1 and 2;

DETAILED DESCRIPTION OF A PREFERRED EMBODIMENT

Figure 1:
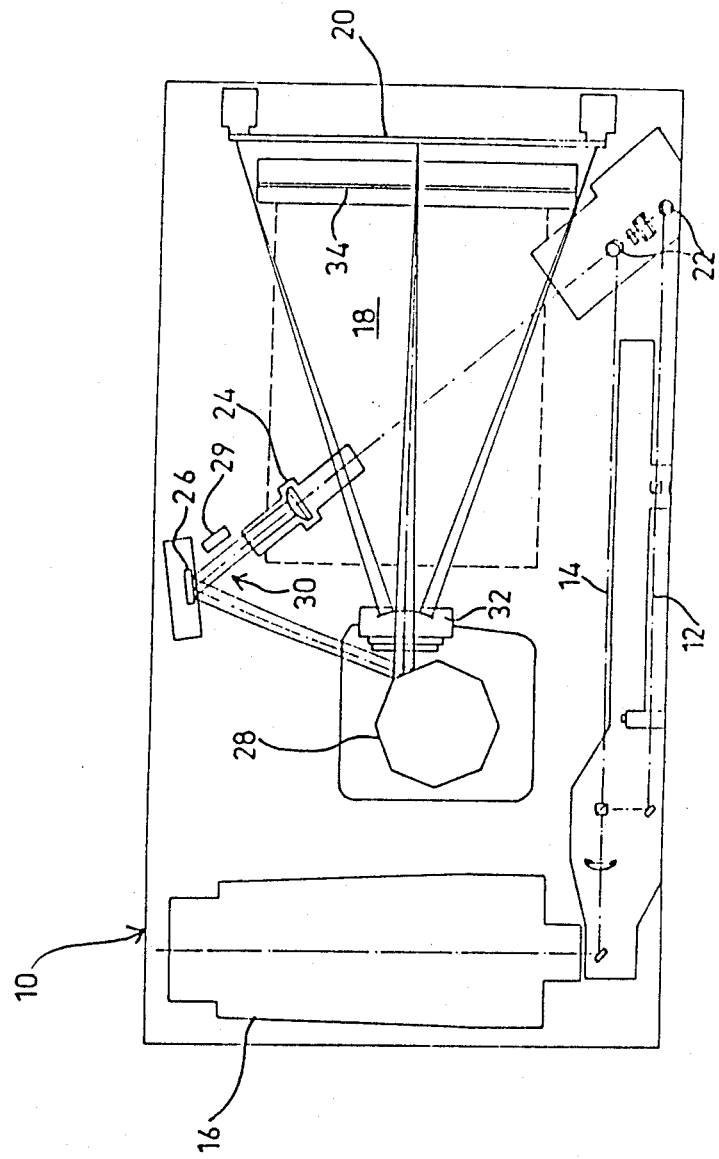
FIG. 1 is an illustration of a general optical diagram showing the optical path for generating and utilizing scanning and reference laser beam in accordance with a preferred embodiment of the present invention.

Referring now to FIG. 1, there is shown a general optical diagram of a preferred embodiment of the present invention. An optical table 10 is provided on which there is arranged an optical path for generating and utilizing scanning and reference leaser beams 12 and 14 originating from a laser source 16. Such an optical path is described more fully in our previous Israel Patent Application, Ser. No. 80242 filed Oct. 7, 1986, which is incorporated herein by reference.

Briefly, scanning and reference beams 12 and 14 are provided by splitting the output beam from laesr source 16. The reference beam 14 is used to track the scanning beam 12 as it exposes film 18, and this is accomplished by a beam position detector 20. Deflection of reference beam 14 is controlled by deflectors 22 in accordance with feedback received from the beam position detector 20.

After deflection, scanning and reference beams 12 and 14 are combined to be in near perfect spatial overlap for a substantial protion of the remaining optical path. Upon entering a beam expander assembly 24, scanning and reference beams 12 and 14 are expanded and then reflected by mirror 26 onto rotating mirror 28. As described further herein, a thermal stabilization fan 29 is disposed adjacent the portion 30 of the optical path through which the expanded beams 12 and 14 pass. From rotating mirror 28, beams 12 and 14 are reflected and projected through an f-theta lens 32 which extends the focal lengths of the beams towards the extremities of the arc, thus flattening most of the arc into a straight line. This ensures sharp focus of the beams on the film 18 and the beam position detector 20 along the entire scan line and substantially eliminates wide-angle distortion.

From the f-theta lens 32, reference beam 14 is projected directly onto the beam position detector 20, while scanning beam 12 is reflected from a mirror 34 onto film 18. The position of reference beam 14 on the beam position detector 20 corresponds to the position of scanning beam 12 on film 18. Thus, tracking of a reference beam 14 is necessary and sufficient for locating scanning beam 12 on film 18. In other words, all necessary positional information is supplied by tracking the reference beam 14, and adjustments to the reference beam 14 position are duplicated for the scanning beam 12.

Unwanted variations in the position of scanning and reference beams 12 and 14 are introduced by a number of factors, among them the thermal variations between the air layers along portion 30 of the optical path, in which the beams are at their maximum width. Because the index of refraction of air is related to temperature, when beams 12 and 14 pass through these air layers, they undergo different degrees of refraction which is perceived in the focusing of these beams by lens 32, which may typically have a focal length of 500 mm. FIG. 2 shows a schematic illustration of the effect of the thermal variations on the focusing of a typical beam.

As shown in FIG. 2, a cross-sectional area 34 of a laser beam such as beam 12 propagating along portion 30 of the optical path passes through air layers 36, which are depicted by wavy lines to indicate the existence of thermal variations between them. These thermal variations may be caused by stray sources of waste heat, i.e. from laser source 16 itself, which may consume 1 kilowatt of energy. When directed through equipment surfaces such as optical table 10, waste heat may create increased heat dissipation problems where premature operation of the equipment occurs without allowing for adjustment to environmental ambient temperatures.

Even if the thermal variations are small between air layers 36, these layers generate different indices of refraction and the accumulation of the effect over long path lengths of beam 12 is perceptible as non-uniform focusing of wavefronts 33 when focused by lens 32. The effect is similar to that caused by heat rising from the asphalt surface of a paved road on a hot day, wherein the eye perceives aberrations in focusing of objects near the road surface.

The undesired effects of thermal variations in air layers is especially troublesome in the portion of the optical path where beam 12 is at its maximum width. The wavefront of beam 12 is no longer of uniform phase but is instead corrugated so that a corrugated beam 40 having a varying beam intensity distribution is produced, as represented graphically in FIG. 2a. The beam intensity distribution changes over time and space as the thermal variations themselves vary, and beam tracking in the range of 1 micron is made impossible under these conditions.

In accordance with the principles of the present invention, elimination of this problem is achieved by the provision of an air turbulance generator in the form of a fan 29 adjacent portion 30 of the optical path (FIG. 1). Fan is arranged and operated so as to generate air turbulence by forcing air flow across the optical path in the direction of arrow 39, which way be perpendicular to the optical path, as shown in FIG. 3. Forced air flow of a sufficient magnitude causes air turbulence cells 42 to be distributed in random fashion throughout the mass of air in this region, and stratification of the air layers due to thermal variations is no longer possible.

Figure 3A:
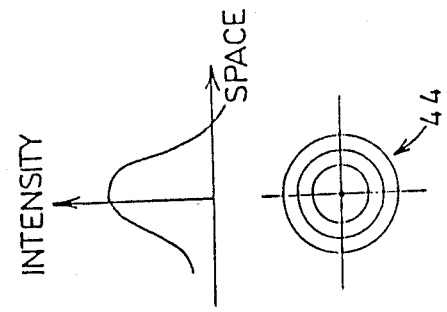
FIG. 3a is graphic representation of the effect of the air flow arrangement of FIG. 3.
Figure 3:
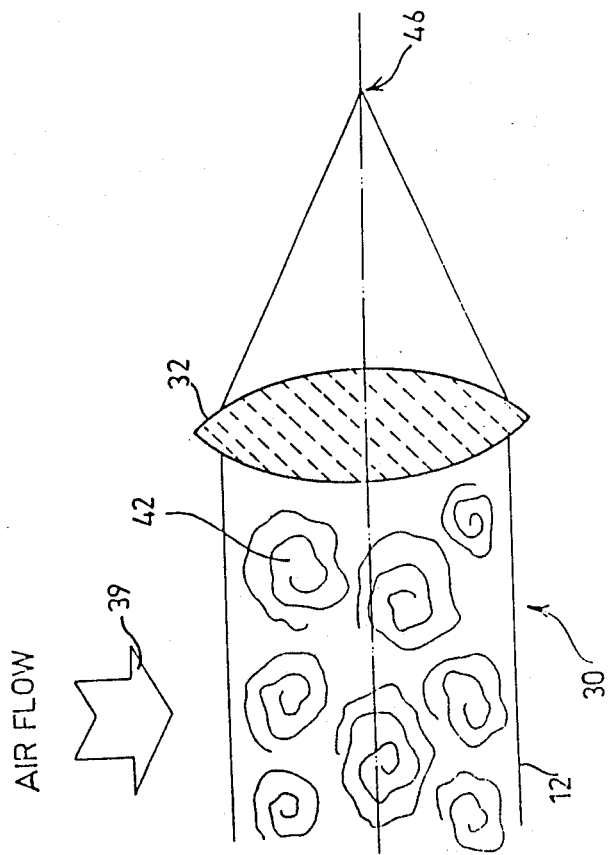
FIG. 3 is a schematic illustration of a forced air flow arrangement for eliminating the thermal variations of FIG. 2.

FIG. 3a graphically represents the effect of the forced air flow on the wavefront 44 of beam 12. Which is now of uniform phase and has an intensity distribution which is substantially time and space invariant. Consequently, if lens 32 were a perfect lens, focus of beam 12 to a diffraction-limited perfect point 46 would be within the capability of lens 32.

It will be appreciated that the precise arrangement of fan 29 in relation to portion 30 of the optical path is not critical, assuming suffucent air turbulence is provided to insure good mixing of the air mass and good averaging of the index of refraction presented to beam 12. Therefore, it is preferable that a fan 29 be arranged to force the air flow across the portion 30 of the optical path wherein the beam has been expanded to its maximum width. In addition, air current deflectors can be mounted on fan 29 so as to vary the direction of the forced air flow deflection across the optical path.

In a preferred embodiment, fan 29 is a pancake-type cooling fan such as that manufatured by Rotron Corp. (USA) an sold under the tradename SPRITE model SU2A5, rated at 30 CFM. Typical values of the length of portion 30 of the optical path are 30 cm, with beam 12 having a width of 25 mm through cross-sectional area 34. However, these values may vary in different applications, the significance of the beam length and width being related to the size of region through which the beam passes as compared to the size of the airflow column in order to achieve adequate coverage. To achieve the required airflow in particular cases, the fan can be arranged for variable speed control.

In an alternative embodiment, the air turbulence generator can be provided in the form of a source of compressed air which is directed across the optical path as described above.

While the principles of the invention have been described with regard to a particular embodiment, it is to be understood that the description is made by way of example only and not as a limitation on the scope of the invention, which is set forth in the appended claims.

I claim:

1. A laser beam scanner including a laser source providing an output beam, a beam splitter operative to split said output beam into a scanning beam and a reference beam, a beam expander expanding said scanning beam and reference beam, mirror means for reflecting said scanning beam onto a film and said reference beam onto a beam position detector, said scanning beam and reference beam being at least partially overlapped along an optical path between said beam expander and said mirror means and having a given beam intensity distribution, means for elimination of variations in the beam intensity distribution of said scanning beam reference beam along the optical path between the beam expander and the mirror means and comprising an air turbulence generator disposed adjacent a portion of the optical path of the scanning beam and reference beam between the beam expander and the mirror means and adapted to provided forced air flow substantially thereacross, said forced air flow tending to eliminate variations in the index or refraction of air layers in said optical path, thereby to eliminate variations in the beam intensity distribution therealong.

2. The device of claim 1 wherein said turbulence generator is a fan disposed substantially perpendicular to said optical path portion.

3. The device of claim 2 wherein said optical path portion comprises a region in which said laser beam is at its maximum width.

4. The device of claim 2 wherein said them beam intensity distribution is subtantially time and space invariant.

5. The device of claim 1 wherein said air turbulence generator is a source of compressed air.

6. The device of claim 1 wherein said optical path portion comprises a region in which said laser beam is at its maximum width.

7. The device of claim 1 wherein said beam intensity distribution is subtantially time and space invariant.

8. In a laser beam scanner including a laser source providing an output beam, a beam splitter operative to split said output beam into a scanning beam and a reference beam, a beam expander expanding said scanning beam and reference beam, mirror means for reflecting said scanning beam onto a film and said reference beam onto a beam position detector, said scanning beam and reference beam being at least partially overlapped along an optical path between said beam expander and said mirror means and having a given beam intensity distribution, a method of eliminating stratification of air layers causing index of refraction variations therebetween along a portion of an optical path between the beam expander and the mirror means, said method comprising the step of causing air turbulence by forcing the flow of air substantially across said optical path portion between the beam expander and the mirror means 9. The method of claim 8 wherein a fan in disposed substantially perpendicular to said optical path portion to provide said forced air flow.

10. The method of claim 9 wherein said optical path portion comprises a region in which said laser beam is at its maximum width.

11. the method of claim 9 wherein the beam intensity distribution along said optical path portion is substantially time and space invariant.

12. The method of claim 8 wherein a source of compressed air provides said forced air flow.

13. The method of claim 11 wherein said optical path portion comprises a region in which said laser beam is at its maximum width.

14. The method of claim 8 wherein the beam intensity distribution along said optical path portion is substantially time and space invariant.

* * * * *